United States Patent
Tallon et al.

(10) Patent No.: US 7,627,958 B2
(45) Date of Patent: Dec. 8, 2009

(54) TAPE MEASURE END PIECE WITH SLIDABLE HOOK

(75) Inventors: Hauke Philip Derek Tallon, Rayleigh (GB); Barry Howard Lee, Rayleigh (GB)

(73) Assignee: Fisco Tools Limited, Essex (GB)

( * ) Notice: Subject to any disclaimer, the term of this patent is extended or adjusted under 35 U.S.C. 154(b) by 0 days.

(21) Appl. No.: 11/979,718

(22) Filed: Nov. 7, 2007

(65) Prior Publication Data

US 2008/0060209 A1   Mar. 13, 2008

Related U.S. Application Data

(63) Continuation of application No. 10/503,942, filed as application No. PCT/GB02/03522 on Aug. 1, 2002.

(30) Foreign Application Priority Data

Feb. 18, 2002   (GB) ................ 0 203 789.3

(51) Int. Cl.
    *G01B 3/10*   (2006.01)
(52) U.S. Cl. .................. 33/758; 33/755; 33/768; 33/770
(58) Field of Classification Search ........... 33/757–760, 33/755, 767, 768, 770, 771
    See application file for complete search history.

(56) References Cited

U.S. PATENT DOCUMENTS

| | | | |
|---|---|---|---|
| 1,973,843 A | | 9/1934 | Buck |
| 2,574,272 A | | 10/1951 | McCully |
| 3,131,480 A | | 5/1964 | Quenot |
| 3,205,584 A | * | 9/1965 | Overaa ............ 33/760 |
| 3,362,075 A | * | 1/1968 | Quenot ............ 33/770 |
| 4,300,289 A | | 11/1981 | DeHaven |
| 4,305,206 A | * | 12/1981 | Roe ............... 33/770 |
| 5,010,657 A | | 4/1991 | Knapp |
| 5,659,970 A | * | 8/1997 | Reedy ............. 33/758 |
| 5,894,677 A | * | 4/1999 | Hoffman .......... 33/758 |
| 6,032,379 A | | 3/2000 | Usami |
| 6,052,914 A | * | 4/2000 | Soon .............. 33/758 |
| 6,101,734 A | | 8/2000 | Ten Caat et al. |
| 6,115,931 A | * | 9/2000 | Arcand ............ 33/668 |
| 6,226,886 B1 | | 5/2001 | Lamond et al. |

(Continued)

FOREIGN PATENT DOCUMENTS

FR          2 669 997 A1      6/1992

(Continued)

OTHER PUBLICATIONS

Translation of JP56163401A, Tsukamoto, Tape Measure Improvement, by McElroy Translation Company for the USPTO, Apr. 2008, total of 14 pages.*

*Primary Examiner*—Amy Cohen Johnson
(74) *Attorney, Agent, or Firm*—Buchanan Ingersoll & Rooney PC

(57) ABSTRACT

A measuring tape having a concave blade marked with a measuring scale on the concave surface, and an end hook having a hooking portion, wherein the end hook has a portion which partially covers and is attached to the convex side of the blade and is slidable between limit points with respect to the blade.

17 Claims, 4 Drawing Sheets

U.S. PATENT DOCUMENTS

| | | |
|---|---|---|
| 6,370,790 B1 | 4/2002 | Stenger |
| 6,442,863 B1 * | 9/2002 | Poineau et al. ................ 33/758 |
| 6,637,126 B2 | 10/2003 | Balota |
| 6,678,967 B1 * | 1/2004 | Jueneman .................... 33/758 |
| 2003/0213141 A1 * | 11/2003 | Lin ............................ 33/758 |
| 2006/0053649 A1 | 3/2006 | Greally |

FOREIGN PATENT DOCUMENTS

| | | |
|---|---|---|
| JP | 56163401 A * | 12/1981 |
| JP | 7-91902 | 4/1995 |

* cited by examiner

TAPE MEASURE END PIECE WITH SLIDABLE HOOK

The present application is a continuation of, and claims priority under 35 U.S.C. § 120 to, U.S. patent application Ser. No. 10/503,942, which was filed on Aug. 17, 2004, which was the National Stage filing Under §371 of International Application No. PCT/GB02/03522 filed Aug. 1, 2002, which claimed priority under 35 U.S.C. §119 and/or 365 to British Patent Application No. 0 203 789.3 filed Feb. 18, 2002. The entire contents of each of these applications are hereby incorporated by reference in this application.

This invention relates to tape measures fitted with an end piece. It has become commonplace that a tape measure having a coilable convex metal blade is fitted with a moveable metal hook at the end of the blade. This hook is slidable along the blade through a limited travel equal to a thickness of the hook portion which projects perpendicularly from the blade. This enables the tape measure to be used by pushing the end hook against a surface from which a measurement is to be made ('butt-on') or by hooking the projecting part of the end hook over an edge and pulling on the tape ('hook-on'). These two ways of using the tape effectively measure from opposite faces of the projecting hook portion but the limited travel of the hook relative to the tape compensates for its thickness, giving a true zero measuring position in both butt-on and hook-on conditions.

The customary metal end hook has a portion which projects perpendicularly at the end of the tape and a portion which extends along the convex measuring blade's top surface, i.e. the convex surface. That portion is secured to the blade by rivets which pass through slots in this portion of the end hook and, in some instances, through a reinforcing piece lying adjacent to the reverse face of the measuring blade.

This construction has the disadvantage that the start of the measuring scale on the top surface of the blade is obscured by the portion of the end hook which extends along the convex measuring blade's top surface. This makes it difficult to use such tape measures for measuring small distances, or for taking position readings using the first portion of the measuring blade.

A further disadvantage of this construction is that the metal end hook is vulnerable to being damaged during use, particularly as a result of dropping of the tape measure. This causes bending of the end hook resulting in inaccuracy in the measurement made using the damaged measure.

A first aspect of the present invention makes use of a different location for the end hook by locating it on the underneath concave side of the blade which results in the markings on the top surface of the blade becoming more visible than in prior art measures.

In the first aspect of the present invention a measuring tape has a concave blade marked with a measuring scale on the concave surface and an end hook having a hooking portion, wherein the end hook has a further portion which partially covers and is attached to the convex side of the blade and is slidable between limit points with respect to the blade.

The hooking portion of the end hook extends perpendicularly to the blade, and thus also to the surface of the further portion which is adjacent the blade. Therefore, the hooking portion extends away from the blade on the same side as the end hook is attached to the blade.

A reinforcement for the end portion of the measuring blade is preferably provided on the top surface, i.e. the concave surface, of the blade. This reinforcing piece can be shaped so as not to obscure the measuring scale on the top surface of the blade, and this can be achieved by making it narrow compared to the width of the blade. Typically, the width of the reinforcing position should be less than half the width of the blade. A further or alternative way to avoid obscuring the measuring scale is to make the reinforcement from a substantially transparent material, such as a clear plastic material.

It is preferred that the end hook has at least one projection which engages into and is slidable within an aperture in the blade. Suitably, the projection(s) the aperture(s) are dimensioned to permit but delimit a linear travel of the end piece relative to the blade.

Preferably the aperture or apertures in the blade will be slots with side edges extending parallel to the length of the blade. The projection or projections which engage into these slots will have corresponding surfaces to engage the side edges of these slots. In a convenient arrangement each projection has a circular or oval shape which fits into and is slidable linearly within an oval aperture in the tape. In preferred constructions, there are two or three apertures in the end portion of the measuring blade and corresponding projections on the end hook.

If a reinforcing piece is provided on the top surface of the blade, the three parts, that is to say end hook, measuring blade and reinforcement may be connected together by fastening elements extending through apertures in the blade and attaching the reinforcement piece to the end hook to form an end-piece.

Means fastening the reinforcement piece to the end hook preferably extend through the said projections on the end piece but are not relied upon to control the travel of the end piece relative to the measuring blade.

The blade is typically metal, and is conventionally made from steel strip. However, other suitable materials include fibre reinforced plastic.

A second aspect of the present invention makes use of a different construction for the end hook by manufacturing it from a material which is not easily damaged during use.

In the second aspect of the present invention a measuring tape has a metal blade marked with a measuring scale and an end hook, the end hook being slidable between limit points along the blade, wherein the end hook is formed from a non-plastically deformable non-metallic material.

Suitable materials include optionally modified polymers and co-polymers of polyacrylamide, nylon, and polyester. Examples of polyacrylamide nylon copolymers include Fortron™ and Ixef™. Glass filled nylon, e.g. Grillon™, is also suitable.

The first and second aspects of the invention, along with their preferences, may be combined. Further, the end hook of the first aspect may be made from other materials, such as metal.

Embodiments of aspects of the invention will now be described with reference to the accompanying drawings in which.

Figure 1:
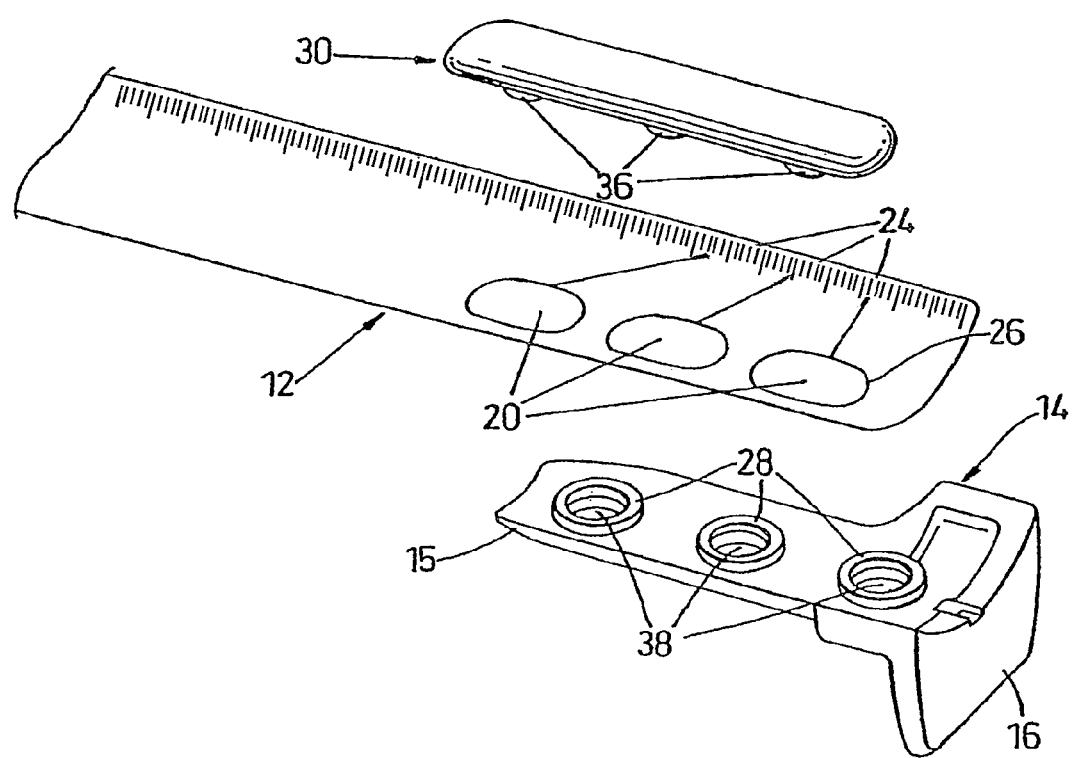
FIG. 1 is an exploded perspective view showing the end portion of the measuring blade and parts to be attached to it.
Figure 2:
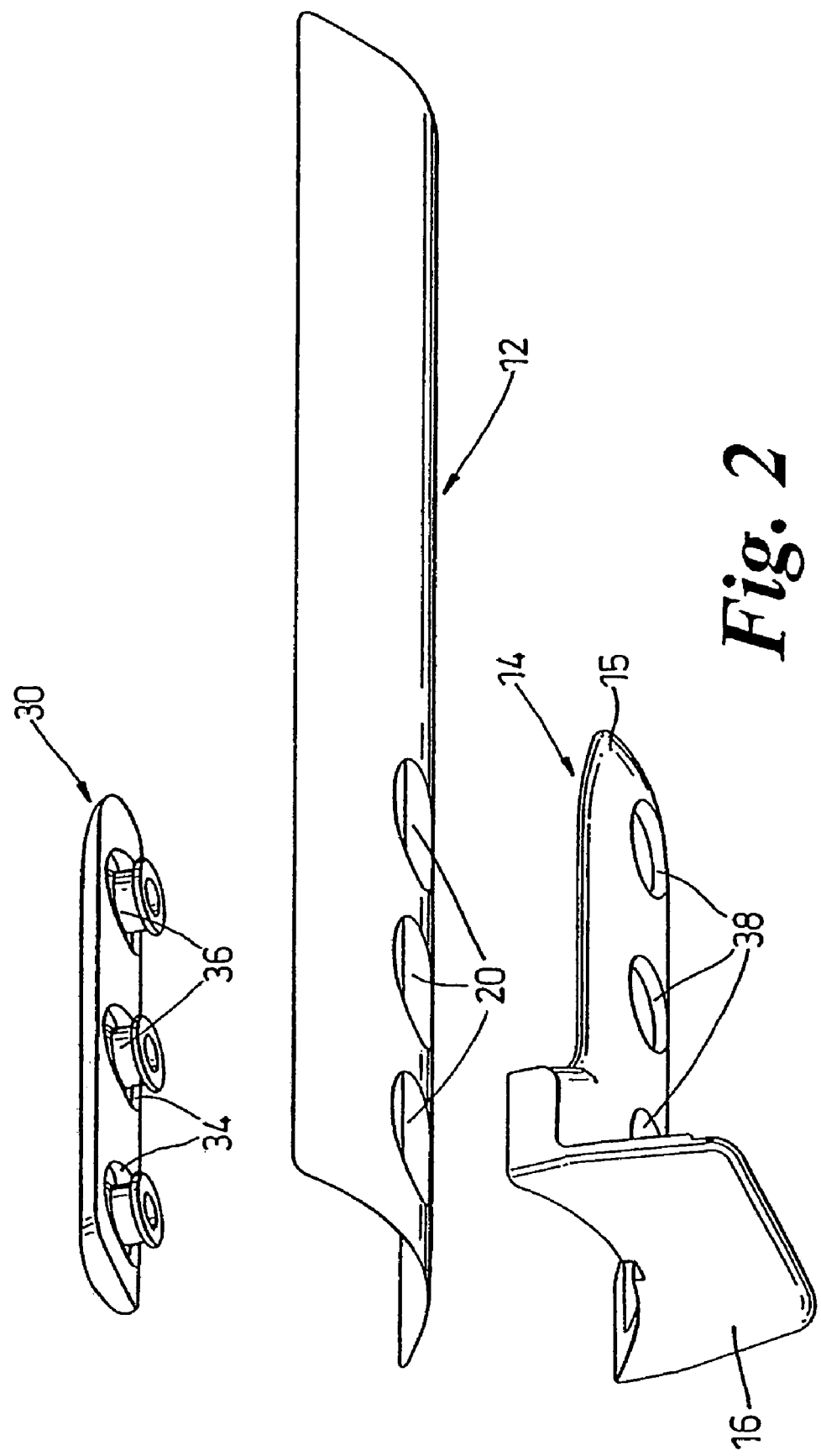
FIG. 2 is an exploded view from below.

The tape measure blade (12) shown in FIGS. 1 and 2 is formed, in conventional fashion, from steel strip with curved cross-section. Its concave upper surface is seen in FIG. 1. It is coated and marked with a measuring scale. When not in use the tape measure blade is coiled as a spiral within a casing and it is drawn out from this casing when required for use. At the end of this blade (12) there is an end hook (14) which is made of Grillon™. It has a portion (15) which overlies the convex face of the measuring blade and a hook portion (16) which projects perpendicularly from the blade (12). At the opposite face of the measuring blade, there is a reinforcement piece (30) which is a transparent plastic moulding. Together the end hook (14) and the reinforcement piece (30) make up the end piece.

As seen in FIGS. 1 and 2, three apertures (20) are punched through the tape blade. These apertures (20) are ovals with straight side edges (24) parallel to the longitudinal axis of the tape blade and semi-circular end surfaces (26).

The reinforcement piece (30) is a transparent plastic moulding, which has three cylindrical recesses (34) within which there are upstanding posts (36), which are shown in FIG. 2 as they will appear in the final product, i.e. with rivet heads (see below)

Figure 3:
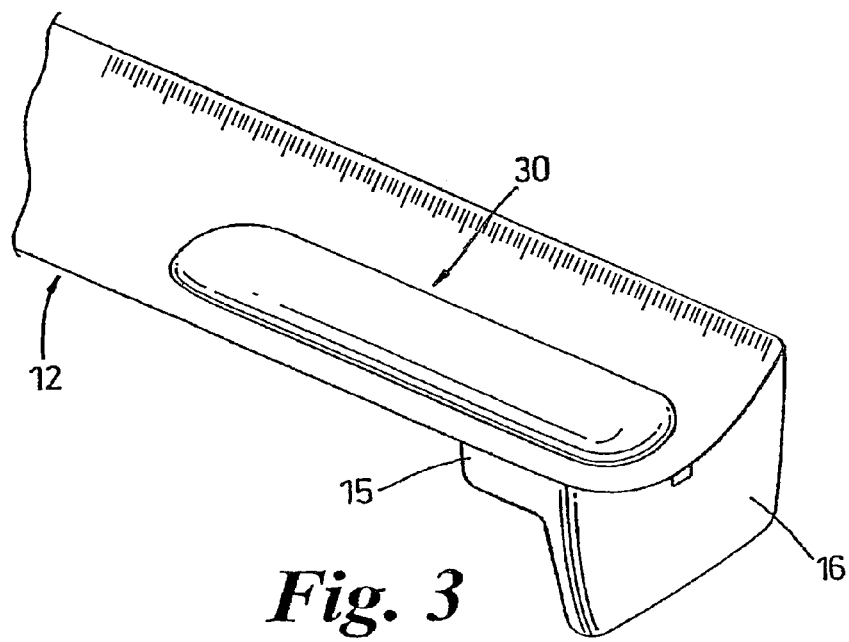
FIG. 3 shows the assembled parts from above the blade.
Figure 4:
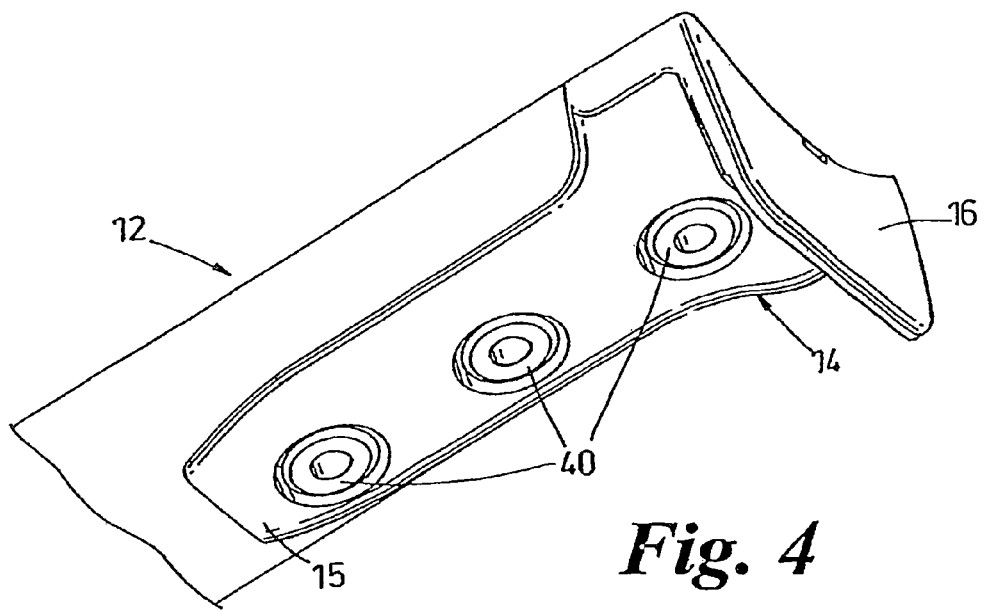
FIG. 4 shows the assembled parts from below the blade.
Figure 5:
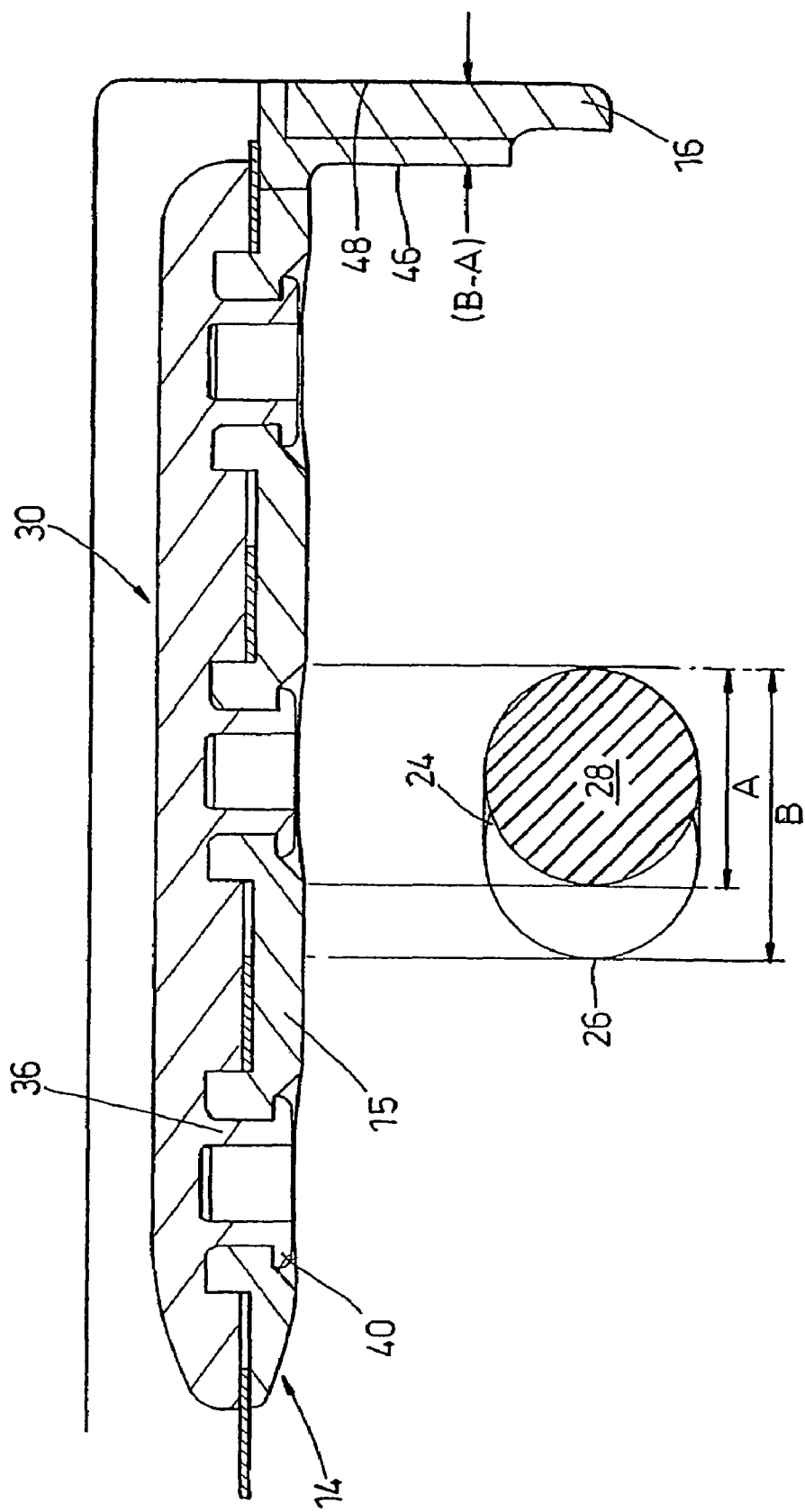
FIG. 5 is an enlarged cross-section along the centre line of the measuring blade, with a diagram of a projection and corresponding aperture.

When these parts are assembled together, the posts (36) project through the apertures (20) in the blade and the end hook is placed in position with its portion (15) overlying the convex lower face of the blade and with the projections (28) extending through apertures (20) in the blade into the recesses (34) in the reinforcing piece. The posts (36) extend through round holes (38) in the projections (28). The parts are fastened together by applying heat and deforming the projecting heads of the posts (36) to form rivet heads (40) which clamp the portion (15) of the end hook to the reinforcement plate (30) with the end portion of the measuring blade captured between the two as shown in FIGS. 3, 4 and 5. In an alternative embodiment, the posts (36) and the holes (38) may be oval shaped.

Preferably, heat is applied by using hot air blowers, and the subsequent deformation carried out using an unheated anvil. The assembly of the parts prior to the application of heat is usually accomplished manually. The depth of the recesses (34) in the reinforcement piece (30) is arranged such that after assembly the portion of the blade captured between the end hook and reinforcing piece is a sliding fit between them.

The edges of the abutments (28) fit against the straight side edges (24) of the oval apertures (20) and thus prevent any lateral movement of the end piece relative to the blade. The diagram in FIG. 5 indicates the length (A) of each of the projections (28) which differs from the length (B) of each of the apertures (20) by an amount which is precisely equal to the thickness of the hook portion (16).

When the tape measure is used, the end hook may be hooked over an object and the tape gently pulled so that the face (46) of the hook portion (16) becomes the functional abutment surface bearing on the object which is being measured. The measuring blade slides relative to the end piece and reinforcing piece to the position shown in FIG. 5. The markings on the tape blade (12) are arranged so that in this position they give an accurate measurement of distance from the face (46).

Alternatively, the end piece may be pushed against a surface so that the surface (48) of the hook becomes the functional abutment surface. The measuring blade slides the other way relative to the end piece and reinforcing piece for the distance permitted by the projections (28) and apertures (20). This linear sliding motion is limited to the difference (B−A) between the lengths of the apertures (20) and the projections (28). That distance is made precisely equal to the thickness of the hook portion (16) so that when the measuring blade and end piece are pressed against a surface, the scale on the measuring blade correctly indicates the distance from the face (48) of the end piece.

It will be appreciated that in this constructional arrangement, the portion (14) of the end piece is secured to the reinforcing plate (30) by the pins (36) which have been deformed to become rivets. However, this fastening between the two parts is not utilised to control the linear travel of the end piece relative to the measuring blade. That is determined by the lengths of the apertures (20) and projections (28). Consequently the accuracy of this travel is effectively governed by the accuracy of the manufacturing operations in which the projections (28) are made by moulding and the apertures (20) are made by stamping through the tape measure blade. These manufacturing operations can be carried out with greater dimensional accuracy than assembly and riveting operation of the conventional construction.

The end hook may be made from other materials. If it is made from metal then the projections (28) can be made by half shearing (if the end hook is pressed) or by moulding (if the end hook is die cast)

By placing the end hook under, rather than over, the blade, the visibility of the measuring scale on the top surface of the blade is greatly increased, making the tape measure easier to use.

The invention claimed is:

1. A measuring tape comprising:
   (i) a concave blade marked with a measuring scale on the concave surface, and an opposing convex surface; and
   (ii) an end hook having a hook portion, wherein the end hook has a portion comprising an uppermost surface which partially covers and is attached to the convex side of the blade and is slidable between limit points with respect to the blade, and wherein the entire hook portion extends perpendicularly away from the convex surface of the blade such that no portion thereof projects above the convex surface in the direction of the concave surface.

2. A measuring tape according to claim 1, wherein a reinforcing piece for an end portion of the blade is provided on the concave surface of the blade.

3. A measuring tape according to claim 2, wherein the reinforcing piece is made from a substantially transparent material.

4. A measuring tape according to claim 1, wherein the end hook has at least one projection which engages into and is slidable within an aperture in the blade.

5. A measuring tape according to claim 4, wherein the projection and aperture have substantially equal widths transverse to the blade, but the aperture has greater length, longitudinally of the blade, than the projection.

6. A measuring tape according to claim 1, wherein the blade is metal.

7. The measuring tape of claim 1, wherein the end hook is formed from a non-plastically deformable non-metallic material.

8. A measuring tape according to claim 7, wherein the end hook is made from one or more polymers, modified polymers or copolymers of polymers, modified polymers or copolymers of polyacrylamide, nylon and polyester.

9. A measuring tape comprising:
   a blade, the blade comprising a concave surface marked with a measuring scale and an opposing convex surface, the blade further comprising a longitudinal end portion; and
   an end hook comprising a hook portion having a thickness and the entire hook portion projecting perpendicularly away from the convex surface of blade such that no portion thereof projects above the convex surface in the direction of the concave surface, and a portion comprising an uppermost surface at least partially overlying the convex surface;

wherein the end hook is mounted to the blade in a manner such that relative longitudinal movement of a magnitude that is approximately equal to the thickness of the hook portion is permitted between the blade and the end hook, thereby providing a true zero measuring position in either a butt-on or hook-on measuring position.

10. The measuring tape of claim 9, wherein the blade is metal.

11. The measuring tape of claim 9, further comprising a reinforcing piece provided on the concave surface at the end portion of the blade.

12. The measuring tape of claim 11, wherein the reinforcing piece is made from a substantially transparent material.

13. The measuring tape of claim 9, wherein the blade comprises at least one aperture having a first longitudinal length, and the end hook comprises at least one projection having a second longitudinal length, the at least one projection received within the at least one aperture and the first longitudinal length exceeds the second longitudinal length by an amount that is equal to the thickness of the hook portion.

14. The measuring tape of claim 9, wherein the end hook is formed of a non-plastically deformable non-metallic material.

15. The measuring tape of claim 14, wherein the material comprises one or more polymers, modified polymers or copolymers of polyacylamide, nylon and polyester.

16. A measuring tape comprising:

a concave blade marked with a measuring scale on a concave surface, and an opposing convex surface;

an end hook having a hook portion. wherein the end hook has a portion comprising an uppermost surface which partially covers and is attached to the convex surface of the blade and is slidable between limit points with respect to the blade, wherein the entire hook portion extends perpendicularly away from the convex surface of the blade such that no portion thereof projects above the convex surface in the direction of the concave surface, and wherein the end hook is formed from a non-plastically deformable non-metallic material; and a reinforcing piece for an end portion of the blade provided on the concave surface of the blade, the reinforcing piece made from a substantially transparent material.

17. The measuring tape of claim 16, the material comprises one or more polymers, modified polymers or copolymers of polyacrylamide, nylon and polyester.

* * * * *